United States Patent [19]

Meixner et al.

[11] Patent Number: 5,470,897
[45] Date of Patent: Nov. 28, 1995

US005470897A

[54] RADICALLY CURABLE COATING COMPOSITIONS AND THEIR USE FOR COATING WOOD SUBSTRATES

[75] Inventors: Jürgen Meixner, Krefeld; Wolfgang Fischer, Meerbusch; Manfred Müller, Erkelenz, all of Germany

[73] Assignee: Bayer Aktiengesellschaft, Leverkusen, Germany

[21] Appl. No.: 234,753

[22] Filed: Apr. 28, 1994

[30] Foreign Application Priority Data

May 5, 1993 [DE] Germany .................. 43 14 866.2

[51] Int. Cl.⁶ .................. C08L 67/06; C08K 5/10; C08K 5/01
[52] U.S. Cl. .................. 523/518; 523/500; 524/314; 524/315; 524/378; 524/487; 524/488; 524/489; 524/538
[58] Field of Search .................. 523/518, 500; 524/487, 488, 489, 538, 314, 315, 378

[56] References Cited

U.S. PATENT DOCUMENTS

| | | | |
|---|---|---|---|
| 3,249,615 | 5/1966 | Ackermann | 523/518 |
| 3,953,395 | 4/1976 | Farone | 523/500 |
| 4,107,012 | 8/1978 | Fuhr et al. | 204/159.19 |
| 4,285,845 | 8/1981 | Russell | 523/518 |
| 4,336,169 | 6/1982 | Hamer et al. | 523/518 |
| 4,551,492 | 11/1985 | Aerts | 524/315 |
| 4,888,372 | 12/1989 | Abrams et al. | 524/315 |
| 4,888,373 | 12/1989 | Abrams | 524/315 |
| 5,095,066 | 3/1992 | Meixner et al. | 524/500 |
| 5,198,480 | 3/1993 | Benton et al. | 523/500 |

*Primary Examiner*—Peter A. Szekely
*Attorney, Agent, or Firm*—Joseph C. Gil; Thomas W. Roy

[57] ABSTRACT

A radically curable coating composition containing) 50 to 95 parts by weight of an unsaturated polyester component having a viscosity at 23° C. of 1,000 to 15,000 mPa.s, B) 5 to 50 parts by weight of compounds containing (meth)acryloyl groups and/or vinyl ether groups, C) 0.01 to 0.3 wt. %, based on the total weight, of waxes and/or paraffins having a melting point of 35+ to 100° C. and D) 0 to 10 wt. %, based on the total weight, of at least one plasticizer or carbamic acid resin, and the use of the coating composition for coating substrates, in particular wood substrates.

8 Claims, No Drawings

RADICALLY CURABLE COATING COMPOSITIONS AND THEIR USE FOR COATING WOOD SUBSTRATES

BACKGROUND OF THE INVENTION

1. Field of the Invention

The present invention relates to a novel lacquer composition based on special, olefinically unsaturated polyester resins which may be radially cured at temperatures of below 80° C. and to their use for coating substrates, in particular wood.

2. Description of the Prior Art

The binders based on unsaturated polyester resins which are customarily used for radially curable coatings generally contain styrene as a copolymerizable monomer. Styrene evaporates during processing resulting in costly purification of the air in production shops and the exhaust air from drying units.

DE-AS 2,221,335 describes UV-light curable, unsaturated polyester resins, which do not contain styrene, as binders for coating compositions. They are, however, used in film thicknesses of less than 50 μm. Greater film thicknesses considerably lengthen drying times, particularly if the coatings are to be cured with peroxides.

Unsaturated polyester resins that have a similar structure and do not contain monomers are known from DE-OS 3,900,257. However, because the drying time of these products, which act as binders for coating compositions, is excessively long at room temperature, they must be cured by infrared irradiation.

Systems containing styrene frequently contain paraffin as a drying accelerator. During radial curing, this paraffin floods to prevent the disruptive influence of atmospheric oxygen. It has been shown that monomer-free binders according to DE-OS 3,900,257 to which paraffin was added, have very long drying times. After curing, the resultant lacquer films have both poor polishability and a surface with poor flow-out.

An object of the present invention is to provide a novel coating composition based on polyester resins that do not contain styrene, which may be rapidly cured by free radical polymerization to give hard, readily sandable and polishable surfaces without poor flow-out.

This object may be achieved with the coating compositions according to the invention which are described in greater detail below.

SUMMARY OF THE INVENTION

The present invention relates to a coating composition which may be radically cured at temperatures below 80° C. and contains A) 50 to 95 parts by weight of an α,β-ethylenically unsaturated polyester component having a viscosity at 23° C. of 1,000 to 15,000 mPa.s and containing at least one polyester resin prepared by reacting at an equivalent ratio of carboxyl groups to hydroxyl groups of at most 1:1
   a) a dicarboxylic acid component containing 75 to 100 carboxyl-equivalent-% of α,β-ethylenically unsaturated dicarboxylic acids having 4 or 5 carbon atoms and/or their corresponding anhydrides and 0 to 25 carboxyl-equivalent-% of other dicarboxylic acids having 4 to 10 carbon atoms or their anhydrides with
   b) an alcohol component containing 15 to 60 hydroxyl-equivalent-% of at least one β,γ-ethylenically unsaturated alkenyl ether alcohol having 6 to 14 carbon atoms and 40 to 85 hydroxyl-equivalent-% of other mono- and/or dihydric alcohols having a molecular weight of 32 to 400, B) 5 to 50 parts by weight of compounds containing (meth)acryloyl groups and/or vinyl ether groups and having a viscosity at 23° C. of 10 to 1,000 mPa.s and a molecular weight of 72 to 1,000, wherein the sum of the parts by weight of A) and B) is 100, C) 0.01 to 0.3 wt. %, based on the total weight of components A) to D), of a barrier agent containing one or more waxes and/or paraffins having a melting point of 35° to 100° C. and D) 0 to 10 wt. %, based on the total weight of components A) to D), of one or more plasticizers or carbamic acid resins.

The present invention also relates to the use of these coatings composition for coating substrates, in particular wood substrates.

DETAILED DESCRIPTION OF THE INVENTION

Acid component a) contains 75 to 100, preferably 90 to 100 carboxyl-equivalent-% of α,β-ethylenically unsaturated dicarboxylic acids having 4 to 5 carbon atoms and/or their anhydrides. Examples include fumaric add, itaconic acid, itaconic anhydride, maleic acid, maleic anhydride and mixtures of these acids and/or anhydrides. Fumaric acid, maleic acid and maleic anhydride are preferred; fumaric acid is particularly preferred.

In addition to the α,β-olefinically unsaturated dicarboxylic acids or their anhydrides, acid component a) may contain up to 25, preferably up to 10 carboxyl-equivalent-% of other dicarboxylic acids or dicarboxylic anhydrides. Examples include saturated, aliphatic dicarboxylic acids with 4 to 10 carbon atoms (such as succinic acid, adipic acid, sebacic acid) and/or their anhydrides; cycloaliphatic dicarboxylic acids or dicarboxylic anhydrides with 8 to 10 carbon atoms (such as norbornenedicarboxylic acid) or their anhydrides; and aromatic dicarboxylic acids or dicarboxylic anhydrides with 8 carbon atoms (such as phthalic acid, phthalic anhydride, isophthalic acid or terephthalic acid).

Alcohol component b) contains 15 to 60 hydroxyl-equivalent-% of at least one β,γ-ethylenically unsaturated alkenyl ether alcohol with 6 to 14 carbon atoms and preferably one hydroxyl group per molecule. Such substances include in particular the allyl ethers of polyhydric alcohols which fulfil this definition, such as for example trimethylolpropane diallyl ether, glycerol diallyl ether or pentaerythritol triallyl ether, preferably trimethylolpropane diallyl ether.

Alcohol component b) also contains 40 to 85 hydroxyl-equivalent-% of other mono- or polyhydric, preferably mono- or dihydric alcohols having a molecular weight of 32 to 400. Examples of these alcohols are methanol, ethanol, n-hexanol, isooctanol, isododecanol, benzyl alcohol, ethylene glycol, diethylene glycol, propylene glycol or alcohols containing ether groups, having the required number of carbon atoms and obtained by the alkoxylation of the preceding alcohols. Preferred dihydric alcohols have 2 to 6 carbon atoms, while preferred monohydric alcohols have I to 12 carbon atoms.

In the production of polyesters A), carboxyl component a) and alcohol component b) are used in quantities such that the equivalent ratio of carboxyl groups to hydroxyl groups is at most 1:1, preferably 0.6:1 to 1:1.

The unsaturated polyesters may be produced using known methods, for example by melt esterification of the alcohols and acids or the esterifiable derivatives thereof, c.f. "Methoden der organischen Chemie" (Houben-Weyl), 4th editions, vol. 14/2, Georg Thieme Verlag, Stuttgart 1961, pp. 1–5, 21–33, 40–44.

Esterification preferably proceeds under an inert gas atmosphere at temperatures of 140° to 190° C.

The unsaturated polyesters A) have acid numbers of 0 to 50, preferably 5 to 45 and hydroxyl numbers of 10 to 150, preferably 10 to 130 mg KOH/g. The number average molecular weight ($M_n$, determined by gel permeation chromatography with a polystyrene standard) of polyesters A) is 300 to 2,000, preferably 400 to 1,500.

In order to protect unsaturated polyesters A) from undesirable, premature crosslinking, it is recommended to add during production of the esters 0.001 to 0.1 wt. % of polymerization inhibitors or antioxidants. Suitable stabilizers are described in "Methoden der organischen Chemie" (Houben-Weyl), 4th edition, vol. 14/1, p. 433 et seq., Georg Thieme Verlag, Stuttgart 1961.0.01 to 0.05 wt %, based on the weight of the polyester, of toluhydroquinone is very suitable.

Component B) of the coating composition according to the invention is selected from compounds containing (meth)acryloyl groups and/or vinyl ether groups which satisfy the requirements previously set forth.

Suitable compounds containing vinyl ether groups include ethers having one or two vinyl groups per molecule and a molecular weight of 72 to 500. Examples include vinyl isobutyl ether, hydroxybutyl vinyl ether, cyclohexyl vinyl ether, 1,4-butanediol divinyl ether, triethylene glycol divinyl ether or 1,4-bis-hydroxymethyl cyclohexane divinyl ether.

Particularly suitable compounds containing (meth)acryloyl groups are those containing (meth)acrylate groups and having a molecular weight of 170 to 1,000. Examples include the (meth)acrylic acid esters of benzyl alcohol, ethylene glycol, 1,4-butanediol, 1,6-hexanediol, glycerol, trimethylolpropane, pentaerythritol, sorbitol and the (meth)acrylic acid esters of the polyether alcohols corresponding to these alcohols, which may be obtained in a known manner by the alkoxylation of the preceding alcohols that do not contain ether groups using propylene oxide and/or ethylene oxide.

The weight ratio of components A) to component B) is 50:50 to 95:5, preferably 70:30 to 95:5.

Suitable barrier agents C) are waxes and preferably paraffins having a melting point of 35° to 100° C., preferably 40 to 80° C. They are used in quantities of 0.01 to 0.3 wt. %, preferably 0.02 to 0.2 wt. %, based on the total weight of components A) to D).

Component D) is selected from known plasticizers such as adipic acid esters, e.g., the polycondensation product of 0.3 moles of maleic anhydride, 0.7 moles of adipic acid and 1.1 moles of ethylene glycol or preferably carbamic acid resins such as Resamine HF 450, a carbamic acid resin based on butylurethane and formaldehyde available from Hoechst.

Component D) is used in quantities of 0 to 10 wt. % based on the total weight of components A) to D). However, coatings according to the invention which do not contain component D) display aging behavior which results in reduced polishability after storage of the coated surfaces for several days. In order to obtain durable good polishability of the coated surfaces it is preferred to use component D) in an amount of 0.1 to 10 wt. %, more preferably 3 to 7 wt. %, based on the total weight of components A) to D).

The coating compositions according to the invention may also contain additives E), which are known and include extenders, pigments, dyes, thixotropic agents, levelling agents, flatting agents and flow control agents, which may be used in customary quantities.

The coating compositions may be used without additional copolymerizable monomers or solvents because they are low viscosity products. It is, however, possible to add monomers or solvents in cases where even lower viscosities are desired.

The coating compositions according to the invention are cured, optionally after the evaporation of volatile auxiliary substances such as inert solvents, either by high-energy radiation, such as UV light or electron beams, or preferably with siccatives in combination with (hydro)peroxides at temperatures between room temperature and 80° C.

Suitable siccatives include cobalt and manganese salts of fatty acids such as linseed oil fatty acids, tall oil fatty acids and soya oil fatty acids; resin acids such as abietic acids and naphthenic acids; acetic acid; and isooctanoic acid. Cobalt octoate and cobalt naphthenate are preferred. The siccatives are preferably used as organic solutions in quantities such that the metal content, based on unsaturated polyester, is 0.005 to 1 wt. %.

(Hydro)peroxides include dicumyl peroxide, di-tert.-butyl peroxide, benzoyl peroxide, cyclohexanone peroxide, methyl ethyl ketone peroxide, acetylacetone peroxide, dinonyl peroxide, bis-(4-tert.-butylcyclohexyl)peroxydicarbonate, tert.-butyl hydroperoxide, 2,5-dimethylhexane-2,5-hydroperoxide and diisopropylbenzene monohydroperoxide. The (hydro)peroxides are preferably used in quantities of 1 to 10 wt. %, based on the weight of the unsaturated polyesters.

If crosslinking is to be achieved by UV irradiation, it is necessary to add photoinitiators to the coating compositions. Suitable photoinitiators are known and described, for example, in "Methoden der organischen Chemie" (Houben-Weyl), vol. E 20, p. 80 et seq., Georg Thieme Verlag, Stuttgart 1987.

Examples of suitable compounds include benzoin ethers such as benzoin isopropyl ether; benzil ketals such as benzil dimethyl ketal; and hydroxyalkyl phenones such as 2-hydroxy-2-methyl-1-phenyl-1-propan-1-one. The photoinitiators are used in quantities of 0.1 to 10 wt. %, based on the weight of the unsaturated polyesters.

The following examples illustrate the invention in greater detail. All parts and percentages are by weight, unless otherwise indicated.

EXAMPLES

Unsaturated polyester resins A

The starting components set forth in Table 1, together with 0.02% of toluhydroquinone, were subjected to melt condensation at 160° to 180° C. under a stream of nitrogen, until the stated acid values and viscosities were reached.

TABLE 1

|  | Polyesters according to the invention | | | | Comparative polyesters | |
|---|---|---|---|---|---|---|
|  | 1 | 2 | 3 | 4 | 5 | 6 |
| Starting components (mol) | | | | | | |
| Fumaric acid | 1.0 | 1.0 | 1.0 | 1.0 | 0.7 | 1.0 |
| Tetrahydrophthalic anhydride | — | — | — | — | 0.3 | — |
| Ethylene glycol | — | 0.6 | 1.0 | — | — | — |
| 1,2-propanediol | — | 0.6 | 1.0- | — | — | — |
| Trimethylolpropane diallyl ether | 0.7 | 0.5 | 0.6 | 0.6 | 0.7 | 0.3 |
| Benzyl alcohol | 0.3 | 0.5 | — | — | 0.3 | 0.7 |
| n-hexane | — | — | — | 0.4 | — | — |
| Polyester characteristics | | | | | | |
| Acid number (mg KOH/g) | 39 | 41 | 35 | 40 | 32 | 34 |
| Viscosity (mPa · s at 23° C.) | 3100 | 3000 | 3600 | 3100 | 3500 | 3800 |

The polyesters were formulated as spray coatings in accordance with the formulations set forth in Table 2 and were sprayed in a single operation at a rate of 300 g/m² onto oak-veneered chipboard.

The coatings according to examples 1 to 4 were wipeable after 1 hour, while those according to comparative examples 5 to 8 were still tacky.

After storage for 24 hours at room temperature, the coatings according to Examples 1 to 4 were very readily sandable and polishable. Polishability remained at the same high level even after storage for several days.

TABLE 2

|  | Examples | | | | Comparative Examples | | | |
|---|---|---|---|---|---|---|---|---|
|  | 1 | 2 | 3 | 4 | 5 | 6 | 7 | 8 |
| Lacquer composition (parts by weight) | | | | | | | | |
| Polyester 1 | 95 | | | | | | | |
| Polyester 2 | | 95 | | | | | | |
| Polyester 3 | | | 95 | | | | | |
| Polyester 4 | | | | 95 | | | | |
| Polyester 5 | | | | | 95 | | | |
| Polyester 6 | | | | | | 95 | | |
| 1,4-butanediol dimethacrylate | 14 | 14 | 14 | 14 | 14 | 14 | — | 14 |
| Plasticizer resin* | 5 | 5 | 5 | 5 | 5 | 5 | 5 | 5 |
| Ethyl acetate | 7 | 7 | 7 | 7 | 7 | 7 | 21 | 7 |
| Defoamer** | 0.2 | 0.2 | 0.2 | 0.2 | 0.2 | 0.2 | 0.2 | 0.2 |
| Paraffin (m.p. 51-53, 10% in toluene | 0.3 | 0.3 | 0.3 | 0.3 | 0.3 | 0.3 | 0.3 | — |
| Cobalt octoate solution (2% metal) | 2 | 2 | 2 | 2 | 2 | 2 | 2 | 2 |
| Cyclohexanone peroxide (50% in plasticizer) | 3 | 3 | 3 | 3 | 3 | 3 | 3 | 3 |

*Resamine HF450, a carbamic resin based on butylurethane supplied by Hoechst.
**Byk-055, supplied by Byk-Chemie, Wesel.

Explanation of Table 2:

Comparative Example 5 contained a polyester produced with an α,β-ethylenically unsaturated dicarboxylic acid in an amount which is outside the scope of the invention.

Comparative Example 6 contained a polyester produced with allyl ether in an amount which is outside the scope of the invention. Comparative Example 7 contained no (meth)acryloyl compound. Comparative Example 8 contained no barrier agent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which may be radically cured at temperatures below 80° C. and which comprises A) 50 to 95 parts by weight of an α,β-ethylenically unsaturated polyester component having a viscosity at 23° C. of 1,000 to 15,000 mPa.s and containing at least one polyester resin prepared by reacting at an equivalent ratio of carboxyl groups to hydroxyl groups of at most 1:1 a) a dicarboxylic acid component containing 75 to 100 carboxyl-equivalent-% of one or more α,β-ethylenically unsaturated dicarboxylic acids having 4 or 5 carbon atoms and/or their corresponding anhydrides and 0 to 25 carboxyl-equivalent-% of one or more other dicarboxylic acids having 4 to 10 carbon atoms or their anhydrides with b) an alcohol component containing 15 to 60 hydroxyl-equivalent-% of one or more β,γ-ethylenically unsaturated alkenyl ether alcohols having 6 to 14 carbon atoms and 40 to 85 hydroxyl-equivalent-% of one or more other mono- and/or dihydric alcohols having a molecular weight of 32 to 400, B) 5 to 50 parts by weight of compounds containing (meth)acryloyl groups and/or vinyl ether groups and having a viscosity at 23° C. of 10 to 1,000 mPa.s and a molecular weight of 72 to 1,000, wherein the sum of the parts by weight of components A) and B) is 100, based on the total weight of components A) and B), C) 0.01 to 0.3 wt. %, based on the total weight of components A) to D), of a barrier agent containing one or more waxes and/or paraffins having a melting point of 35° to 100° C. and D) 0 to 10 wt. %, based on the total weight of components A) to D), of one or more plasticizers or carbamic acid resins.

2. The coating composition of claim 1 wherein acid component a) contains 75 to 100 carboxyl-equivalent-% of fumaric acid and alcohol component b) contains 15 to 60 hydroxyl-equivalent-% of trimethylolpropane diallyl ether.

3. The coating composition of claim 1 wherein component D) is present in a quantity of 0.1 to 10 wt. %, based on the total weight of components A) to D).

4. The coating composition of claim 2 wherein component D) is present in a quantity of 0.1 to 10 wt. %, based on the total weight of components A) to D).

5. The coating composition of claim 1 wherein component B) contains 5 to 50 parts by weight of one or more compounds containing (meth)acryloyl groups and having a molecular weight of 170 to 1000.

6. The coating composition of claim 2 wherein component B) contains 5 to 50 parts by weight of one or more compounds containing (meth)acryloyl groups and having a molecular weight of 170 to 1000.

7. The coating composition of claim 3 wherein component B) contains 5 to 50 parts by weight of one or more compounds containing (meth)acryloyl groups and having a molecular weight of 170 to 1000.

8. The coating composition of claim 4 wherein component B) contains 5 to 50 parts by weight of one or more compounds containing (meth)acryloyl groups and having a molecular weight of 170 to 1000.

\* \* \* \* \*